United States Patent Office 3,372,441
Patented Mar. 12, 1968

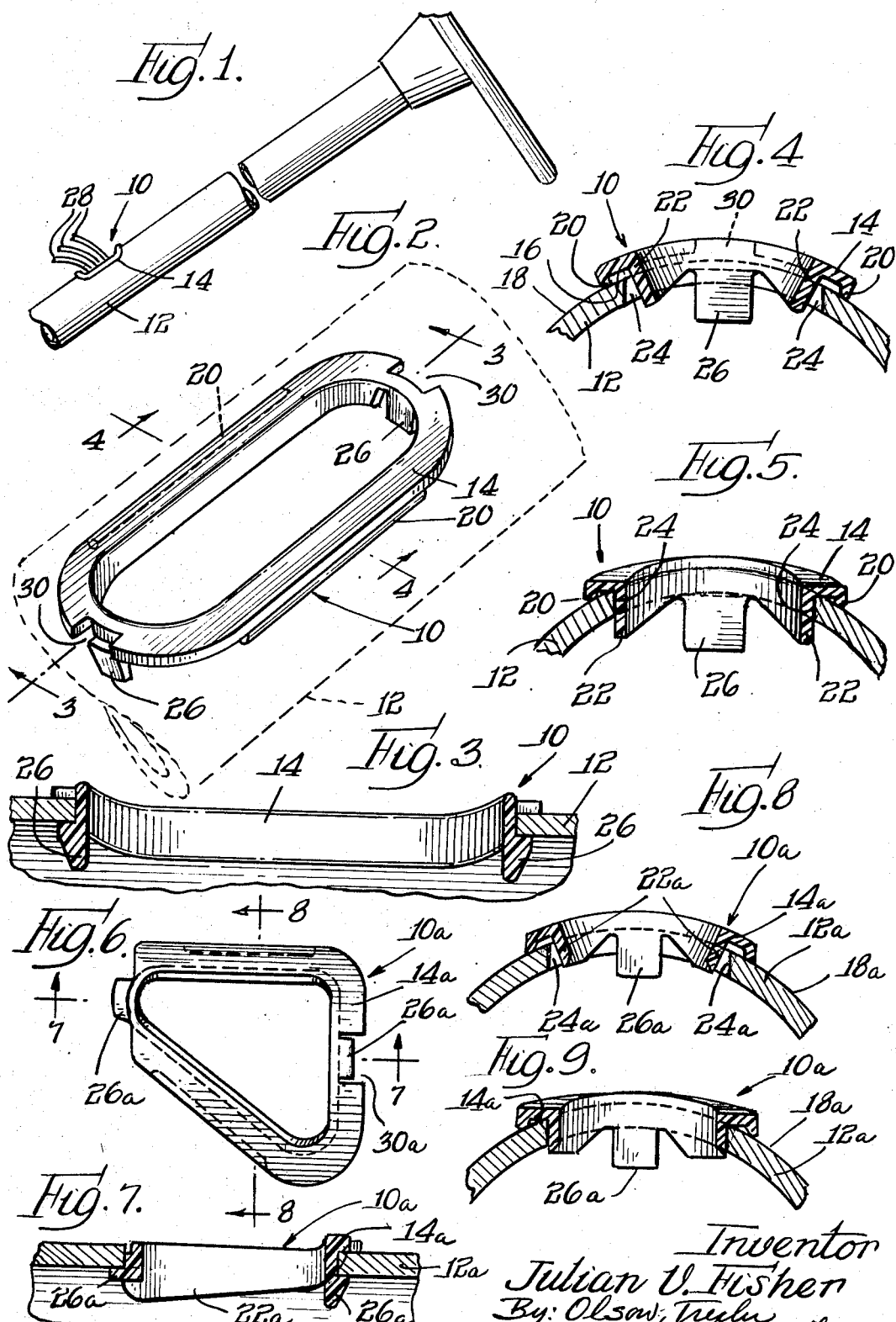

3,372,441
SNAP-IN TYPE GROMMET
Julian V. Fisher, Carpentersville, Ill., assignor to Illinois Tool Works Inc., Chicago, Ill., a corporation of Delaware
Filed Dec. 14, 1966, Ser. No. 601,759
9 Claims. (Cl. 24—141)

This invention relates generally to grommets for application to apertures in arcuately shaped workpieces, and more particularly to grommets adapted to be snapped into locking association with the margin of such apertured workpieces.

These are instances, such as at the base of a hollow steering post of an automobile, for example, where apertures are employed to permit the insertion of elements such as electrical conductors and the like. The external surface of such workpieces as hollow steering posts are arcuate and hence present a problem in adapting the use of grommets for association with the rough edges of the workpiece which define the aperture referred to above. It is, therefore, one of the primary objects of the present invention to provide a grommet which may be snapped into a peripheral aperture in an arcuate shaped workpiece, said grommet providing a smooth, circuitous margin and snugly engaging the outer arcuate or curved surface of the workpiece.

The present invention contemplates a grommet of the type set forth above, preferably formed of resilient plastic material which will provide a smooth aperture defining margin and which, when forced into the work aperture, will snap into interlocking engagement with the edge of the workpiece which defines the aperture, and will also conform substantially with the exterior curved surface of the workpiece.

More specifically, the present invention contemplates a grommet of the type set forth above incorporating a circuitous body portion having a work engaging surface of arcuate transverse cross-section and a lateral flange so formed as to facilitate telescopic association thereof with the work aperture.

It is a further object of the present invention to provide a grommet of the type referred to above which structurally lends itself for manufacture by the practice of conventional plastic molding methods.

The foregoing, and other objects and advantages, will be more apparent from the following detailed description when considered in connection with the accompanying drawing, wherein:

FIG. 1 discloses the grommet of the present invention associated with a conventional automobile steering post;

FIG. 2 is an enlarged perspective view of the grommet shown in association with an aperture of a cylindrical workpiece;

FIG. 3 is a fragmentary longitudinal sectional view taken substantially along the line 3—3 of FIG. 2;

FIG. 4 is a fragmentary transverse sectional view taken along the line 4—4 of FIG. 2 showing the initial telescopic association of the grommet with the workpiece;

FIG. 5 is a fragmentary transverse sectional view similar to FIG. 4, showing the final association of the grommet with the apertured workpiece;

FIG. 6 is a plan view of a grommet in association with a workpiece, said grommet being triangular in shape as distinguished from the oval shape of the grommet shown in FIGS. 1-5, inclusive;

FIG. 7 is a sectional view taken substantially along the line 7—7 of FIG. 6;

FIG. 8 is a view similar to FIG. 4, showing the initial telescopic association of the grommet of FIG. 6 with a workpiece; and FIG. 9 is a fragmentary transverse sectional view similar to FIG. 8 showing the final association of the grommet with the workpiece.

Referring now to the drawing more in detail, wherein like numerals have been employed to designate similar parts throughout the various figures, it will be seen that a grommet of the type contemplated by the present invention is designated generally by the numeral 10. In FIG. 1, the grommet 10 is disclosed in operative association with the lower portion of a conventional automobile steering post 12. In FIGS. 1-5, inclusive, the grommet 10 includes a circuitous body 14 which, in transverse cross-section as shown in FIG. 4, provides an underside or surface 16 conforming substantially with the transverse arcuate or curved shape of the external work surface 18 of the workpiece or steering post 12. In instances where it is found to be desirable, a longitudinal bead 20 may be provided along the underside and adjacent the outer periphery of the body 14. This bead lends lateral strength to the body 14, and cooperates with said body in assuring the desired clamping engagement of the underside of the work surface as shown in FIG. 5.

Attention is directed to flange means 22 extending substantially normal to and formed integral with the grommet body 14. It is preferable to so form the flanges 22 that the outer peripheral surface thereof, when considered in transverse cross-section as illustrated in FIG. 4, extends laterally of the body 14 in substantial parallelism with the radii of the arc defined by the underside of said body. With this arrangement, the initial telescopic association of the flanges 22 with the work aperture 24 is materially facilitated. In other words, a substantial circuitous portion of the peripheral surface of the flanges 22 may be said to incline toward each other, thereby facilitating the ease of insertion of the advancing edges of the flanges within the work aperture 24.

As the grommet 10 is telescopically moved from its initial position of insertion shown in FIG. 4 to its final position as shown in FIG. 5, laterally extending elements or projections 26 interlock with the adjacent margin of the workpiece 12, which defines the aperture 24. In the disclosed embodiment, elements 26 are incorporated in each end of the oval shaped body 14. The above described grommet is preferably formed from plastic material having sufficient inherent resiliency to permit the members 26 to snap into interlocking relation with the workpiece 12 as clearly shown in FIG. 3.

In FIGS. 6-9, inclusive, a grommet designated generally by the numeral 10a is shown, the body portion 14a being substantially triangular in shape. All of the parts of the grommet 10a corresponding with similar parts in the grommet 10 previously described are indicated by the numerals employed in FIGS. 1 to 5, inclusive, bearing the suffix a. In FIG. 8, the grommet 10a is shown in its initial position of telescopic association with the aperture 24a of the workpiece 12a. Shifting the grommet 10a from the position shown in FIG. 8 to the position shown in FIG. 9, the arcuate underside of the body 14a is brought into engagement with the outer peripheral surface 18a of the workpiece. The grommet 10a is provided with a pair of depending or laterally extending locking elements 26a which function similarly to the previously described elements 26. Obviously grommets may be produced in various shapes to accommodate corresponding variously shaped apertures in a workpiece. The grommet 10a is provided with flanges 22a which extend normal to the body 14a and it is preferable to have the outer peripheral surface of the flanges 22a (as viewed in transverse cross-section, FIG. 8) extend in substantially parallelism with the radii of the grommet arc.

From the foregoing it will be apparent that the present invention contemplates a grommet of very simple and practical form which lends itself for convenient application to apertures of various sizes in workpieces of curved or arcuate form. In FIG. 1, as previously mentioned, the grommet 10 is shown in operative association with a conventional automobile steering post 12, and in this position serves to accommodate a plurality of electrical conductors 28. The relatively smooth exterior surface provided by the plastic grommet of circuitous form counteracts tendency for the insulating covering of the conductors to become worn as a result of car vibration. Furthermore, the material of the grommet is nonconductive and thus serves as an electrical insulator should the conductor wires become exposed. Obviously, the invention contemplates the use of grommets in various applications, the disclosed application to an automobile steering post being representative of one such application. The recess or window 30 in the body 14 adjacent each of the projections 26, serves to accommodate a tool such as a screwdriver blade for detaching the grommet from the workpiece.

While for purposes of illustration specific forms of the grommet contemplated by the present invention are shown, it should be understood that the present invention should be limited only by the scope of the appended claims.

The invention is claimed as follows:

1. A resilient grommet for application to a peripheral aperture in a workpiece of arcuate cross section including a circuitous body for superimposing the external surface of a workpiece along the margin of an aperture therein, the under side of said circuitous body normally defining a surface of transverse arcuate shape conforming substantially with the transverse arcuate shape of a work surface to which it may be applied, flange means along the inner margin of said body extending laterally thereof for engaging the edge of a workpiece which defines a work aperture, a substantial circuitous portion of the peripheral surface of said flange means extending laterally of said body in substantial parallelism with radii of the arc defined by the under side of said body, and diverging means extending laterally of the plane of said body and having means extending substantially parallel to the plane of the body for snappingly interlocking with the edge of a workpiece surrounding a work aperture to secure the grommet against unauthorized detachment when the grommet is flattened so that the diverging means snugly engages adjacent edges defining the aperture in the workpiece.

2. A grommet as set forth in claim 1 wherein the means for interlocking with the edge of a workpiece comprises a plurality of circumferential spaced projections provided with shoulders for engaging the under side of a workpiece.

3. A grommet as set forth in claim 1 wherein the means for interlocking with the edge of a workpiece includes substantially diametrically opposed projections having shoulders spaced from the adjacent portion of the body a distance which is sufficient to accommodate the workpiece therebetween.

4. A grommet as set forth in claim 1 wherein the circuitous body is recessed in the immediate vicinity of the means for interlocking with the edge of a workpiece.

5. A grommet as set forth in claim 1 including rib means extending longitudinally of the under side of said body.

6. A grommet as set forth in claim 1 formed of one piece plastic material having sufficient inherent resiliency to accommodate itself to the arcuate surface defining a work aperture.

7. A grommet as set forth in claim 6 wherein the inherent resiliency of the material is sufficient to permit lateral deflection of the laterally extending interlocking means as the grommet is telescopically associated with a work aperture.

8. A grommet as set forth in claim 1 wherein the circuitous body and flange means associated therewith are oblong in shape.

9. A grommet as set forth in claim 1 wherein the body and flange means associated therewith are substantially triangular in shape.

References Cited

UNITED STATES PATENTS

| 3,001,007 | 9/1961 | Klumpp et al. | 16—2 XR |
| 3,082,470 | 3/1963 | Fork | 16—2 |
| 3,162,086 | 12/1964 | Wells et al. | 85—82 |
| 3,337,708 | 8/1967 | Cerveny et al. | 248—27 XR |

FOREIGN PATENTS

| 26,527 | 1913 | Great Britain. |
| 823,722 | 11/1959 | Great Britain. |

DONALD A. GRIFFIN, *Primary Examiner.*